United States Patent Office 2,722,173
Patented Nov. 1, 1955

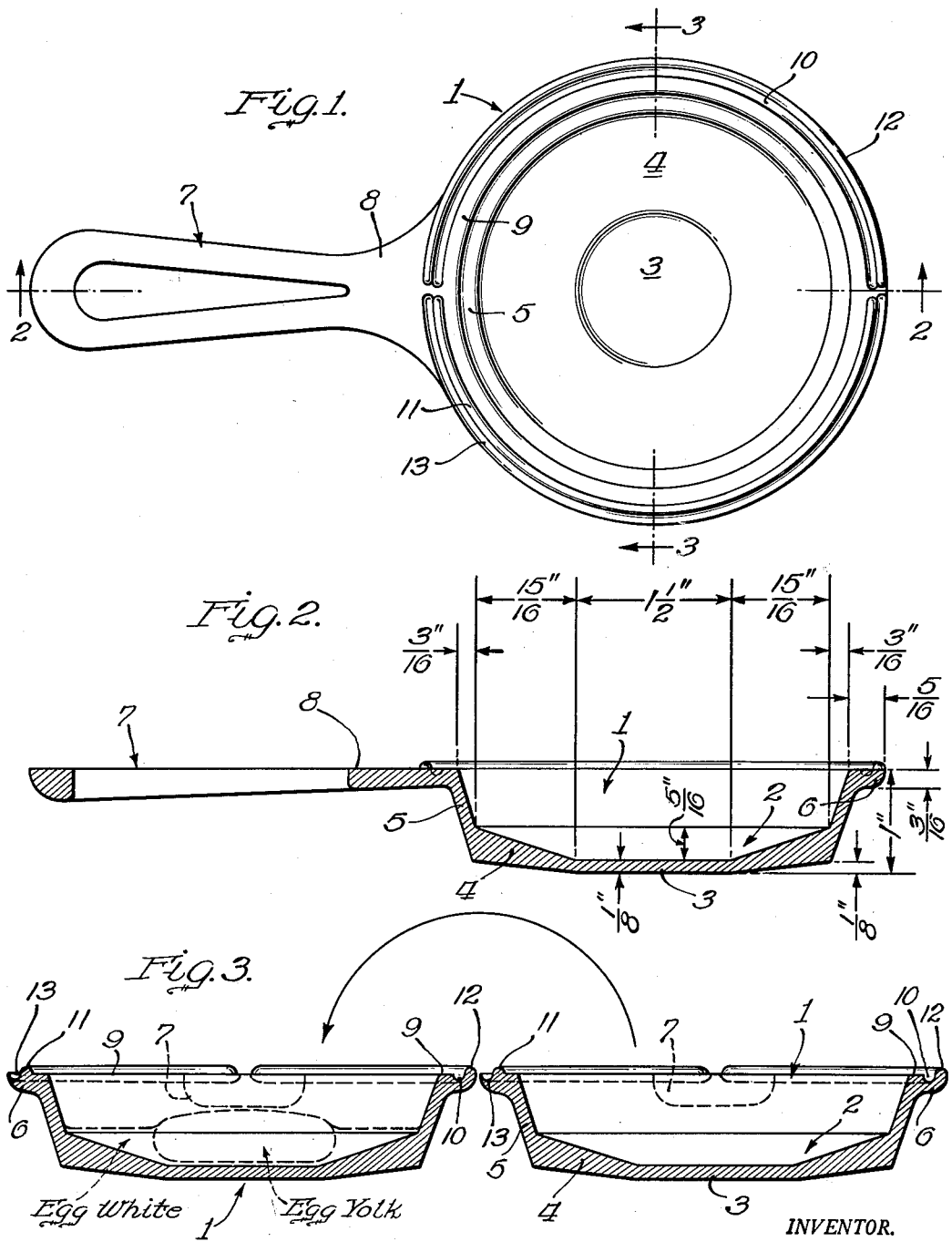

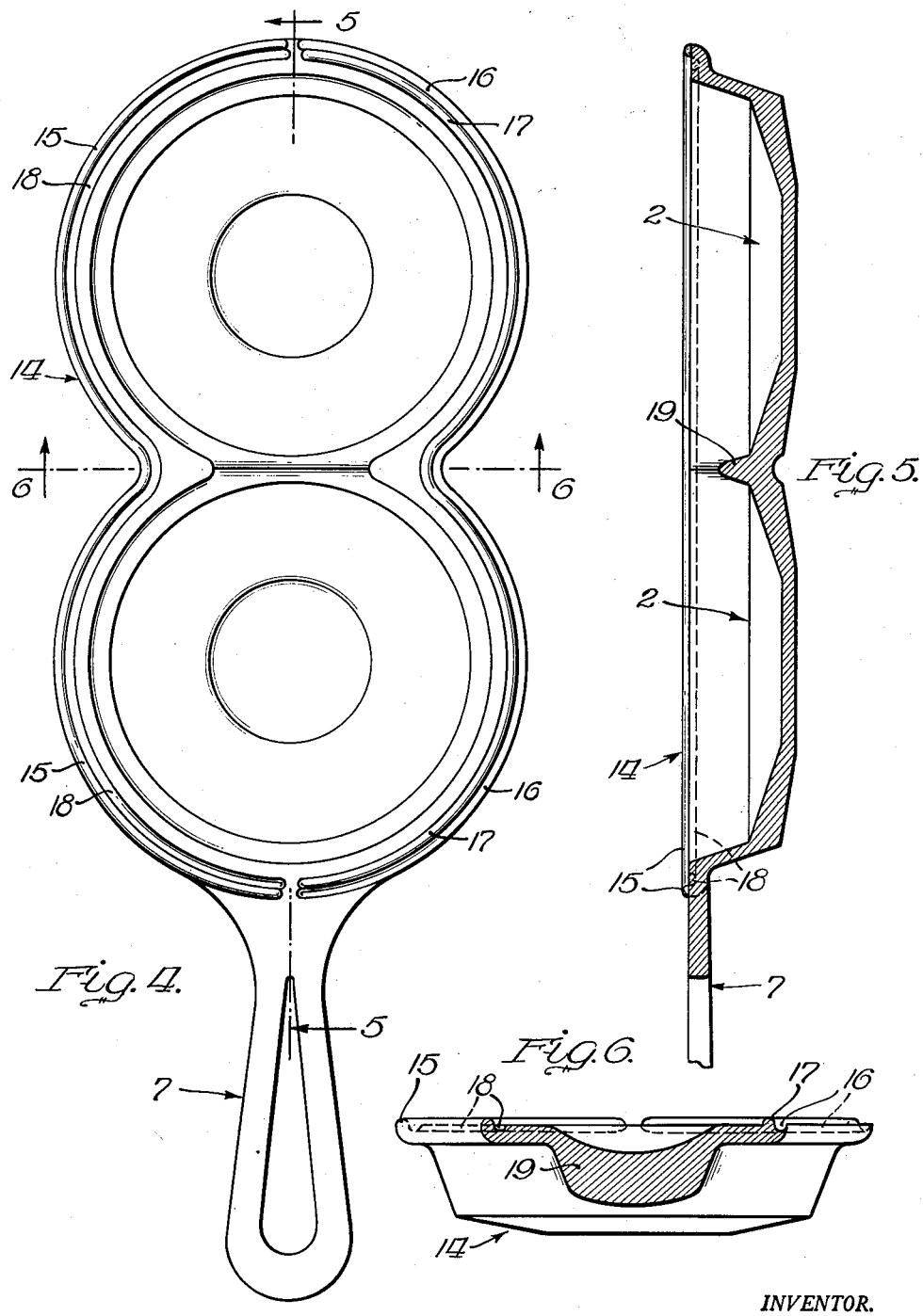

2,722,173

COOKING UTENSIL

Vergil Cunningham, Chicago, Ill., Darrow D. Dorr, executor of said Vergil Cunningham, deceased, assignor to Durward D. Dorr, Chicago, Ill.

Application April 23, 1952, Serial No. 283,840

9 Claims. (Cl. 99—428)

This invention relates to culinary utensils which may be referred to generally as frying pans, sauce pans or frying molds. More particularly stated this invention relates to improvements in a frying pan or frying mold to enable the proper molding and cooking of food as for example the frying of eggs.

Various devices are available for frying or poaching eggs. Some such devices include arrangements for controlling the shape and size of the fried egg. Such control is accomplished by providing oddly configured ribs or vanes within the frying pan whereby to control the configuration or contour of the egg while being fried. Other arrangements in frying pans or skillets contemplate the provision of ribs or vanes interiorly or exteriorly of the frying surface for controlling the heating of the food product during the cooking process. Still other arrangements contemplate the use of removable molds which may be inserted into an ordinary frying pan. The difficulty of manufacturing such devices, the inherent cost of such manufacture, and the difficulty of using and cleaning such devices has prevented them from gaining public acceptance.

It is an object of this invention to provide a culinary utensil such an improved frying pan which obviates the foregoing disadvantages and which is of simple symmetrical design having one or more circular molds adapted primarily for frying or poaching eggs, which controls the form or shape of eggs fried therein and which automatically centers or otherwise symmetrically positions the yolk of the egg with respect to the white of the egg.

Another object of this invention is to provide an improved bottom plate or wall for a culinary device which will prevent warping thereof during heating and which will provide for effective distribution of heat in predetermined relative proportion to the different segments or areas of the bottom plate. In the use of such improved bottom plate in a cooking utensil the most intense heat is provided to the deepest portion of the food being cooked as for example the deepest portion of an egg which is being fried. Less intense heat is provided to the thinnest portion of the food being cooked. By the use of such an arrangement it is possible to secure substantial uniformity in cooking intensity throughout all the food in the skillet and prevent over cooking certain portions of the food.

A further object of this invention is to provide an improved bottom plate for a skillet to permit the easy escape of heated air from below the skillet to thereby prevent over heating of portions of the bottom plate or wall of the skillet.

Another object of the present invention is to provide a structural arrangement for single or multiple mold skillets having the improved bottom plate and being adapted to be inverted one upon another as well as nested one into another.

A still further object of this invention is to provide a simple yet effective sectional or double skillet structure for single or multiple compartment skillets, wherein each of the sections of the double skillet is symmetrical in design and identical with the other section of the skillet and wherein each section of the double skillet is provided with seal elements to effectively seal the matched skillets when one skillet is inverted upon another skillet.

Another object of this invention is to provide an improved arrangement for skillets which are adapted to be nested for storage or inverted one upon another for use as a closed substantially sealed utensil, wherein each skillet is provided with an individual handle so arranged that when the skillets are inverted one upon another the adjacent handles form a single hand grip, and wherein the corresponding elements of each skillet of a particular size are identical in structural arrangement and proportions and may be produced in the same molds or dies.

A further object is to provide a rib and groove arrangement in the symmetrical edges of a multiple sectional circular utensil which will effectively seal the sections one to another, and which will prevent relative rotation of one section with respect to another section.

The foregoing objects and other advantages of this invention may be more readily apparent from a consideration of the following description of the preferred embodiment of the invention as illustrated in the accompanying drawings in which:

Figure 1 is a top plan view of a skillet (single mold) constructed according to the preferred arrangement of this invention;

Figure 2 is a sectional view taken along line 2—2 of the Figure 1 of the drawings;

Figure 3 is a sectional view of two identical single mold skillets placed side by side to illustrate the complementary arrangement of the rib and groove structure whereby to permit the securing of a sealed relatively non-rotatable contact between identical skillets upon the inversion of one such skillet upon the other skillet;

Figure 4 is a top plan view of a skillet (multiple mold) embodying the present invention;

Figure 5 is a sectional view taken along line 5—5 of Figure 4 of the drawings;

Figure 6 is a sectional view taken along line 6—6 of Figure 4 of the drawings.

Referring to the drawings, wherein like numerals are used to identify like elements of the invention, and referring more specifically to Figures 1, 2, and 3 of the drawings, 1 represents generally the body of a circular, integrally cast skillet having a circular bottom plate or wall 2 provided with a depressed relatively thin circular central bottom portion 3 having parallel flat top and bottom sides or surfaces surrounded by an upwardly and outwardly inclined annular bottom portion 4 which increases gradually in thickness from its inner to its outer margins, and an outwardly flared continuous side wall 5 extending upwardly from the outer marginal edge of the bottom 2 and terminating at its upper edge in an outwardly or laterally extending flange 6. A handle 7 extends laterally from the flange 6 with the upper flat face 8 of the handle 7 in the same plane as the upper flat face 9 of the flange 6. The annular bottom portion 4 is provided with an upper and lower surface. Each such surface extends outwardly and upwardly from the flat central portion 3 in the form of a frustum of a cone and at an acute angle to the plane of portion 3. The upper surface of portion 4 is tilted to a greater acute angle than the lower surface thereby providing for the gradual uniform increase in the thickness of the portion 4 from its juncture with the flat portion 3 to its outer margin where it joins the side wall 5.

The preferred embodiment of the invention relates to improvements in a pan adapted particularly for frying eggs, and in accordance with common usage such reference to eggs contemplates eggs of the domestic hen. Such eggs, particularly the market variety, have been found to have a rather uniform combined volume of egg white and egg yolk. Therefore, having in mind some of the objectives of this invention relative to the centering of the egg yolk in the egg white during the frying operation as well as other objectives relating to the application of more intense heat during the frying operation to the deepest part of the egg located in the central portion of the bottom wall of the skillet and the application of heat of decreasing intensity to that portion of the egg of decreasing thickness located over the upwardly inclined portion of the bottom wall of the skillet, it has been found desirable to adhere to certain dimensions in the formation of such a skillet. Reasonable tolerance of approximately plus or minus five per cent in the dimensions should be acceptable.

The improved skillet is preferably made of cast iron or cast aluminum. The depressed central portion 3 of the bottom wall is preferably one-eighth inch thick and one and one-half inches in diameter. The outwardly and upwardly extending annular portion 4 of the bottom 2 is preferably of a radial width of fifteen-sixteenths of an inch and along the circular line of juncture with the central portion 3 is of a thickness of one-eighth of an inch, gradually and uniformly increases radially to a thickness of five-sixteenths of an inch at its outer margin. A diametric sectional view (Figure 2) illustrates that the upper and lower edges of the section through the annular bottom portion 4 each form an acute angle with the plane of the central bottom portion 3. That view also illustrates that the lower marginal outer edge of the annular bottom portion 4 is spaced five-sixteenths of an inch below the corresponding upper marginal outer edge of the bottom portion 4 and is also spaced one-eighth of an inch above the plane of the lower surface of the depressed central bottom portion 3. The outer wall 5 of the skillet extends upwardly and outwardly from the outer marginal edge of the annular bottom portion 4 to a plane one inch above and parallel to the plane of the lower surface of the central bottom portion 3. The inner and outer surfaces of the wall 5 are parallel frusto-conical surfaces and are flared outwardly to such an extent that the inner diameter of the side wall 5 at its upper edge is six-sixteenths of an inch larger than the inner diameter of the side wall 5 along the line of juncture of side wall 5 with the outer marginal edge of the upper surface of the annular bottom portion 4. The outwardly or laterally extending annular horizontal flange 6 provided at the upper edge of the wall 5 is approximately three-sixteenths of an inch thick and together with the upper edge of the wall 5 provides a five-sixteenth of an inch wide symmetrical annular mating surface for another skillet or lid.

As is also clearly illustrated in Figures 1, 2 and 3 of the drawings, skillets constructed according to the present invention are provided in the upper edge 9 of flange 6 of the side wall 5 with a sealing, centering and relative rotation preventing arrangement of grooves and ribs. Groove 10 and rib 11 are of the same radius and each extends through an arc of slightly less than a semicircle, and are positioned symmetrically on opposite sides of a diametrical sectional plane passing perpendicularly through the surface 9. Groove 10 is slightly longer than rib 11 and of such other proportion and configuration as to be adapted to receive a complementary rib 11 from another identical skillet inverted upon the first skillet with the handles 7 in superimposed arrangement. Rib 12 and groove 13 are each of the same radius and are positioned in the annular surface 9 immediately outwardly of and symmetrical with the groove 10 and rib 11 respectively. Rib 12 is slightly shorter than groove 13 but both the rib 12 and groove 13 extend through an arc slightly less than a semicircle. Like unto groove 10, groove 13 is so proportioned and arranged as to be adapted to receive a complementary rib 12 forming a part of the inverted skillet. Similarly the annular sealing and mating surface of the inverted skillet is provided with grooves like unto grooves 10 and 13 but positioned to be complementary to and to receive the ribs 11 and 12. Though the preferred embodiment of the invention is described as embodying a double pair of grooves and ribs in the mating surface 9, a single pair would also function properly and effectively seal and center the matched skillets.

By virtue of the arrangement as described in an improved skillet, skillets embodying the present invention may be inverted one upon the other with the handles 7 in overlapping abutting arrangement and with the grooves 10 and 13 of each of the two skillets in each instance receiving the complementary ribs 11 and 12 of the matched skillets. The handles 7, as clearly illustrated in Figures 1 and 2 of the drawings, are provided with substantially flat upper surfaces lying in the plane of the flat upper edge 9 of the associated skillet 1. The handles 7 are also so arranged that the longitudinal axis thereof lies in a diametral sectional plane of the associated skillet and passes perpendicularly through the surface 9 intermediate the opposed ends of the associated groove 10 and rib 9. Such interfitting of the ribs 11 and 12 with the grooves 10 and 13 of the two skillets which are used to form a double skillet provides an effective seal, prevents relative rotation of one skillet with respect to the other, and enables the manufacture of all of such matching skillets of the same size in the same mold or dies since they are each identical in all structural aspects. Grooves 10 and 13 are preferably of a relatively shallow nature and ribs 11 and 12 of such proportions as to fit nicely into the complementary grooves of a matched skillet.

The improved skillets are also constructed so that the inner and outer surfaces of the annular wall 5 are parallel. The lowermost extremity of the outer surface of wall 5 joins the outer marginal edge of the lower surface of the annular portion 4 of the bottom 2 along a circular line having the same diameter as the circular line of juncture between the lower edge of the inner surface of wall 5 and the outer edge of the top surface of the bottom portion 4. By virtue of this arrangement, like size skillets embodying the present invention may be readily nested.

Figures 4, 5 and 6 of the drawings illustrate a multiple compartment or mold skillet embodying the present invention. Such a skillet differs from the skillet illustrated in Figures 1 and 2 of the drawings in that the skillet includes two molds fixed to one handle with the center line of the handle extending through the aligned diameters of the two molds. The double compartment or mold skillet 14 of Figures 4 and 5 provides in substance an oblong skillet having two circular molds or compartments with the outer walls of the molds being joined centrally of the oblong or oval shaped skillet. As is clearly illustrated in Figure 5 of the drawings, the individual molds of the multiple mold skillet are each provided with an improved bottom plate and inclined outer wall similar unto that provided in the skillet illustrated in Figures 1, 2 and 3 of the drawings. In the multiple mold skillet the flat portions of the bottoms of the individual molds are all located in the same plane whereby to coact to stabilize the skillet. The flanged upper sealing edge of the outer wall of the multiple compartment skillet is provided with a groove and rib arrangement for coaction with complementary grooves and ribs of a superimposed inverted matching skillet in substantially the same manner as hereinbefore described with respect to the single mold skillet illustrated in Figures 1, 2 and 3 of the drawings, to provide an effective seal between the matched skillets. In the multiple compartment skillet a rib 15 extends substantially half way around the upper flanged edge of the multiple compartment skillet. The groove 16 extends substantially around the other half of the upper edge of the multiple compartment skillet and is positioned thereon similarly and symmetrically with respect to the rib 15. Immediately adjacent and inwardly of the groove 16 there is provided a rib 17 and immediately adjacent to and inwardly of the rib 15 there is provided the groove 18. Grooves 16 and 18 are slightly longer than the ribs 15 and 17 respectively and are of such other configuration as to adapt them to receive the ribs 15 and 17 respectively of an identical, inverted superimposed matching duplicate compartment skillet. Similarly the mating sealing edge of the inverted skillet will be provided with grooves complementary to and adapted to receive the ribs 15 and 17 of the lower skillet. As is clearly illustrated in Figures 5 and 6 of the drawings the juncture of the outer walls of the two compartments of the multiple compartment skillet formed by the dividing panel 19 between the two compartments is of such proportion and configuration as to enable partial nesting of one muiltiple compartment skillet into another.

From the foregoing description it will be apparent that this invention provides, among other things, an improved utensil adapted particularly well for the frying of eggs by the application of heat of greater intensity to the thickest portions of the egg and the application of heat of graduated lesser intensity to the thinner portions of the egg while the egg is confined in a circular mold having a depressed central portion whereby to center the yolk of the egg in the circularly molded egg white and fry the egg uniformly without the application of excessive heat to any portion of the egg.

The present invention also provides an improved utensil adapted to achieve the controlled heating of the frying surface of a skillet by arranging for the ready escape of heated air from between the source of heat and the heated surface, thereby to prevent the overheating of portions of the frying surface or bottom wall of the utensil.

A skillet embodying the present invention is also adapted for convenient nesting for storage with other like size and similar skillets and is also adapted for use in an inverted position upon another skillet as a lid for the lower skillet or as a section of a double skillet. In either such use the unique rib and groove sealing arrangement along the mating edges of the skillets provides an effective seal and effective arrangement for preventing the relative rotation of the combined skillets thereby normally maintaining the superimposed handles of the skillets in alignment to provide a convenient single hand grid for both skillets. The novel arrangement of sealing grooves and ribs enables the production of both skillets of a matched pair of skillets in a single set of molds or dies.

In the instance of the circular skillet, a slight relative rotation of the superimposed skillets will force the leading end of each rib out of its complementary groove thereby in effect breaking the seal by slightly separating the mating surfaces of the skillets and permitting the ready escape of vapors while yet retaining the upper skillet effectively located centrally upon the lower skillet by virtue of the contained interlocked arrangements of the overlapped sealing ribs of the two skillets.

In Figure 3 of the drawings there is illustrated by dotted line representation the relative position of an egg white and egg yolk in the circular mold of a skillet. Obviously such a skillet may be utilized to fry or poach an egg and, if desired, two skillets may be combined by inverting one skillet upon the other to enable the frying of the egg on both the upper and lower side by appropriate inversion of the combined skillets during the frying operation.

In the foregoing description of this invention the preferred embodiment thereof has been described with particular reference to a skillet for frying eggs. Obviously, the invention is also usable for other utensils. For those reasons, the invention is not to be restricted to the specifically illustrated preferred embodiment as set forth in the drawings and as herein described, except in so far as is necessitated by the prior art and the appended claims.

The invention is hereby claimed as follows:

1. A sectional culinary utensil adapted for frying eggs on both sides comprising, in combination, first and second identical and nestable and complementary sections having complementary opposed symmetrical flat surfaces when one of said sections is inverted upon the other of said sections, said first section being provided in its opposed symmetrical surface with a groove which extends through less than half of the length of the opposed surface of said first section and also being provided on the remainder of its opposed symmetrical surface with an upstanding rib which extends through less than half of the length of the opposed surface of said first section and positioned on said opposed surface directly opposite from said groove, said second section being provided on its opposed surface with a rib which extends through less than half of the length of the opposed surface of said second section and which rib is complementary to and extends into said groove in said first section and said second section also being provided in its opposed surface with a groove which extends through less than half of the length of the opposed surface of said second section and which groove is complementary to and receives the rib on said first section, a handle element having a substantially flat upper surface extending laterally from the upper peripheral edge of said first section with the plane of said flat upper surface in the same plane as the opposed symmetrical surfaces of said sections, a complementary and similarly positioned and formed handle element on said second section overlying said handle element on said first section, the mentioned groove and the mentioned rib for either section of said culinary utensil being positioned on opposite sides of a plane perpendicular to the symmetrical flat surface with which the rib and the groove are associated, said plane extending through the center of the utensil and through the longitudinal axis of the handle associated with said symmetrical surface, each of said first and second sections having side walls, each of said side walls terminating at one end in one of said complementary opposed symmetrical surfaces and terminating at the opposite end in an integrally formed end wall element, each of said end wall elements including a relatively thin central portion surrounded by a marginal portion which increases gradually in thickness from the relatively thin central portion outwardly toward the side wall, whereby to facilitate the nesting of the utensils.

2. In an egg frying pan, an imperforate bottom wall having a substantially circular flat central portion approximately one-eighth of an inch thick and approximately one and one-half inches in diameter surrounded by a substantially annular portion having an outer diameter of approximately three and six-sixteenth inches and uniformly increasing in thickness outwardly from the thickness of said central portion along the line of juncture with said central portion to a thickness of approximately five-sixteenths of an inch at the outer margin of said annular portion, the upper surface of said annular portion extending outwardly and upwardly at a uniform rate and in the form of the inclined surface of an inverted frustum of a cone, and a side wall formed integrally with said bottom wall extending upwardly and outwardly from the outer margin of said annular portion.

3. An egg frying pan according to claim 2, wherein said annular portion has a lower surface extending upwardly and outwardly at a uniform rate so that the outer marginal edge of said lower surface is approximately one-eighth of an inch above the inner marginal edge of said lower surface, and wherein the upper and lower surfaces of the annular portion have the same diameter as the lower inner diameter of said side wall.

4. In a culinary utensil, a bottom wall having a substantially circular central flat portion with parallel upper and lower surfaces surrounded by a substantially annular portion having upper and lower surfaces extending outwardly and upwardly at uniform but different rates to provide annular surfaces in the form of the inclined surface of an inverted frustum of a cone, said bottom wall uniformly increasing in thickness from the central flat portion thereof outwardly to the outer marginal portion thereof, and a side wall formed integrally with said bottom wall extending upwardly and outwardly from the outer margin of said bottom wall.

5. In a culinary utensil, a bottom wall which has substantially flat upper and lower surfaces on the central portion thereof and which increases in thickness from the central portion thereof outwardly to the outer marginal portion thereof, said marginal portion extending upwardly, and a side wall formed integrally with said bottom wall extending upwardly from said marginal portion.

6. An egg frying pan including an annular side wall having a continuous lower edge, a circular bottom wall formed integrally with said side wall and having a substantially flat circular and uniformly thick depressed central portion of a diameter approximately equal to the diameter of an otherwise unsupported yolk of an egg when disposed on a substantially flat surface, an annular portion of said bottom wall surrounding and joining the outer margin of said central portion to the lower margin of said side wall, said annular portion having upwardly and outwardly extending upper and lower surfaces and increasing gradually at a uniform rate in thickness from the central portion outwardly, said upper surface extending upwardly and outwardly from said circular depressed central portion and defining with said depressed central portion a cup shape in the upper surface of the bottom wall, the cubical capacity of the thus formed cup shaped depression being approximately equal to the combined cubical volume of one egg yolk and one egg white.

7. In a mold for frying eggs, an approximately circular bottom wall having a depressed and uniformly thick circular central portion, said bottom wall having both of its upper and lower surfaces each in the form of a frustum of a cone outwardly from said central portion and increasing in thickness gradually at a uniform rate from said central portion to the outer margin thereof, and an upstanding side wall flared outwardly from said bottom wall, said bottom wall and said side wall being formed integrally and being so constructed, proportioned and arranged that the cubical volume of the interior of the bottom wall is slightly less than the combined volume of an egg white and egg yolk, whereby upon the depositing of an egg white and an egg yolk in said mold the egg yolk will settle to a position immediately above the depressed central portion of the bottom wall and the egg white will completely cover the remainder of the bottom wall to thereby permit the frying of an egg with the egg yolk centered in the egg white and the application during the frying operation of less intense heat to the thin marginal portion of the egg white than will be applied to the relatively thick egg yolk, producing thereby an evenly fried egg.

8. A frying pan comprising identical first and second sections having complementary opposed annular surfaces, said first section being provided on its opposed annular surface to one side of a plane passing through an axis of said first section with an arcuate groove and a parallel substantially co-extensive rib which extends through an arc less than a semicircle, said groove and said rib being concentric with the opposed annular surface on which they are positioned, said first mentioned groove being of greater diameter than said first mentioned rib, said opposed annular surface of said first section on the opposite side of said plane being provided with an arcuate rib and a parallel substantially co-extensive groove which are concentric with the opposed annular surface on which they are positioned and which extend through an arc of a circle substantially as great as the arc of a circle through which said first mentioned groove and said first mentioned rib extended, said second mentioned rib being of a diameter equal to the diameter of said first mentioned groove and said second mentioned groove being of a diameter equal to said first mentioned rib, said second section being provided on its opposed annular surface with ribs complementary to and extending into the grooves in the opposed annular surface of said first section, and said second section being provided in its opposed annular surface with grooves receiving the ribs of said first section.

9. A sauce pan of integral cast construction including a plurality of depressed flat bottom portions lying in the same plane to supportingly cooperate to maintain the stability of the pan, upwardly and outwardly inclined bottom portions surrounding said flat bottom portions, said inclined bottom portions being structurally connected and increasing uniformly in thickness toward their marginal edges, a continuous outer wall portion formed integrally with said bottom portion extending upwardly from the marginal edges of said inclined bottom portions, said pan being divided into compartments by the juncture of segments of said outer wall intermediate adjacent edges of said inclined bottom portions.

References Cited in the file of this patent

UNITED STATES PATENTS

| 195,080 | Beal | Sept. 11, 1877 |
| 216,831 | Collings | June 24, 1879 |
| 1,263,103 | Pfeil | Apr. 16, 1918 |
| 1,313,947 | Lafferty | Aug. 26, 1919 |
| 1,342,444 | Howe | June 8, 1920 |
| 1,925,700 | Matter | Sept. 5, 1933 |
| 2,008,767 | Munn | July 23, 1935 |
| 2,061,610 | Burnette | Nov. 24, 1936 |
| 2,188,492 | Young | Jan. 30, 1940 |
| 2,254,570 | Hailey | Sept. 2, 1941 |
| 2,336,699 | Neth et al. | Dec. 14, 1943 |
| 2,412,325 | Devine et al. | Dec. 10, 1946 |
| 2,493,983 | Lindzy | Jan. 10, 1950 |

FOREIGN PATENTS

| 13,965 | Great Britain | 1913 |
| 220,992 | Switzerland | Dec. 16, 1942 |
| 231,635 | Great Britain | Apr. 9, 1925 |